Patented July 5, 1927.

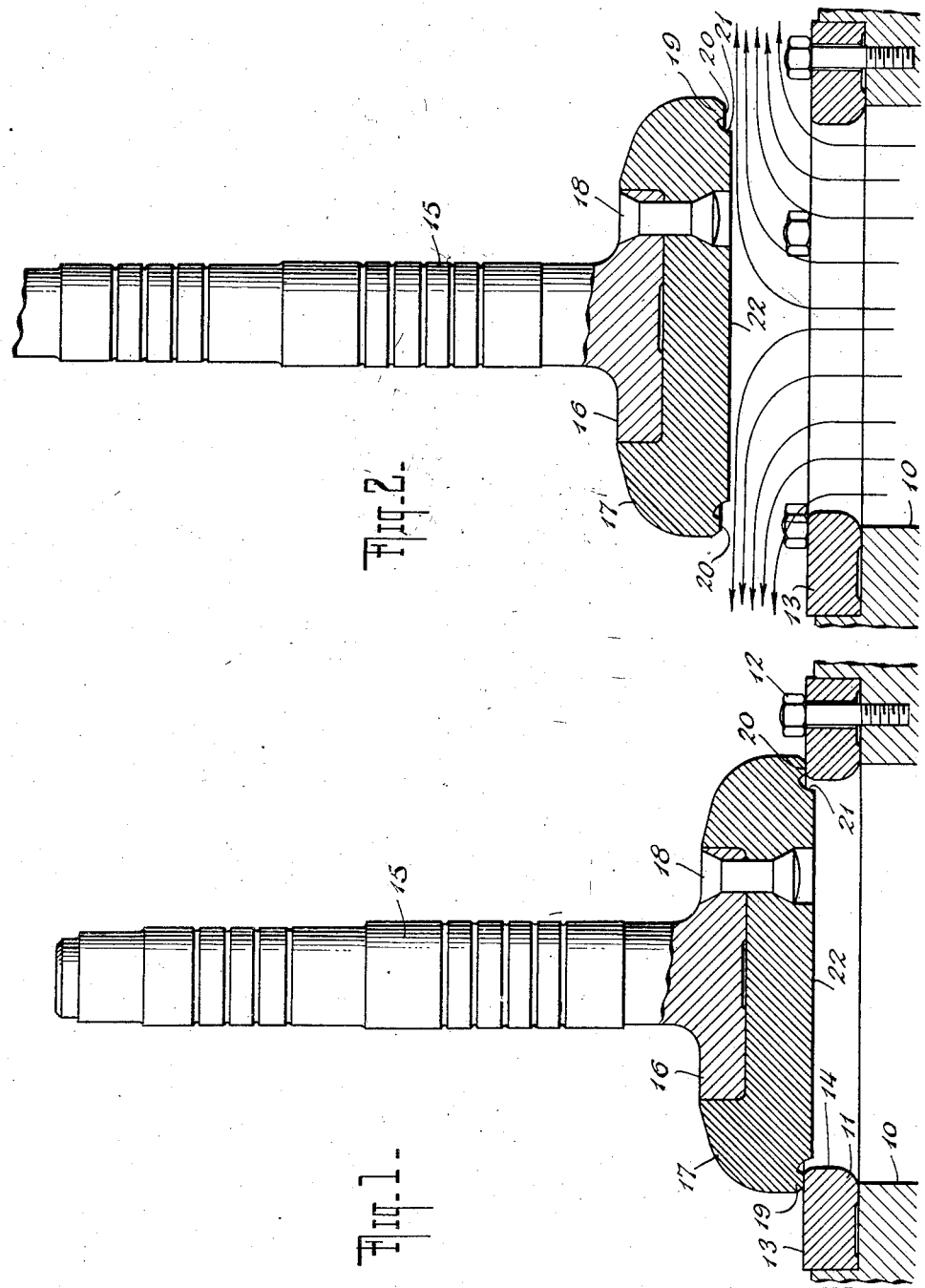

1,634,360

UNITED STATES PATENT OFFICE.

FRIEDRICH HOFMANN, OF MULHEIM-RUHR, GERMANY, ASSIGNOR TO HOLZWARTH GAS TURBINE CO., OF SAN FRANCISCO, CALIFORNIA, A CORPORATION OF DELAWARE.

VALVE.

Application filed May 28, 1926. Serial No. 112,201.

My invention relates to valves and more particularly to valves for internal combustion turbines whereby the nozzles of such engines are controlled. Because of the fact that engines of this type are ofttimes constructed on very large scales, valves for controlling the nozzles therein are of correspondingly large size and are subjected to the effects of relatively large charges of explosion gases. Due to the extremely injurious action of such explosion gases, particularly in relatively large charges thereof, such control valves repeatedly become inefficient for their intended purposes and require either repeated regrinding or replacing, as the case may be. For these reasons it has heretofore generally been necessary to construct such valves of a very high grade of steel capable of withstanding the action of the gases and of being repeatedly refaced for continued use.

The object of the present invention is to provide a valve in which the existing defects are overcome and which is particularly adapted for controlling the nozzles of internal combustion turbines and is constructed in a novel manner to efficiently and positively protect the active sealing surface of the valve against the injurious effects of the aforesaid explosion gases. Other more specific objects will appear from the description hereinafter and the features of novelty will be pointed out in the claims.

In the accompanying drawing, which shows an example of the invention without defining its limits, Fig. 1 is a fragmentary sectional view of the combustion chamber and nozzle with the improved valve combined therewith and illustrated in its closed position, and Fig. 2 is a similar view showing the valve in its open position.

In the drawing, 10 represents a portion of the combustion chamber of an internal combustion turbine of any conventional form and communicating in the well-known way with the customary nozzle ring thereof. The chamber 10 as shown is provided with a valve seat 11 which, in the illustrated example, is shown in the form of a removable nozzle ring detachably secured in place by means of bolts 12; the outer exposed surface of said ring comprises a plane surface 13 which constitutes an annular sealing surface adapted to cooperate with the valve, as will be more fully pointed out hereinafter, to control the flow of gas from the chamber 10 and through the aforesaid nozzle ring.

In the preferred arrangement, the interior annular surface 14 of the valve seat 11 converges toward its center along a curved line from the chamber 10 and then flares outwardly to its point of connection with the plane surface 13. While the arrangement set forth is preferred, it will be understood that other equivalent arrangements may be utilized without materially interfering with the efficiency of the construction. The valve comprises a stem 15 which may be of any conventional form and which, at its one end, terminates in a head 16 to which the body 17 of the valve is secured, for instance by means of rivets or the like 18. The valve body 17 is provided with a sealing member 19 which includes an annular plane sealing surface 20 adapted to cooperate with the surface 13 of the valve seat 11 to close the outlet from the chamber 10 and the said nozzle ring. In addition to the above, the valve includes a deflecting member 21 which projects from the body 17 through the circular space defined by the sealing member 19 and is provided with a plane end surface 22 located in parallelism with the sealing surface 20 and beyond the same in an axial direction, as illustrated in the drawing. The peripheral surface of the deflecting member 21 curves outwardly with respect to the chamber 10 and joins the sealing member 19 at its inner annular surface, which, as shown, may be bevelled with respect to the axis of the valve; the arrangement is such that the periphery of the surface 22 is a relatively sharp well-defined edge, the purpose of which will appear more fully hereinafter.

In the closed position of the valve, as shown in Fig. 1, the sealing surface 20 of the valve is positively and firmly seated upon the surface 13 of the valve seat 11 and thereby closes the exit aperture of the chamber 10. In the open position of the valve, as shown in Fig. 2, the explosion gases or other medium controlled by the valve, in their exit from the chamber 10 or its equivalent, impact squarely against the surface 22 and are deflected thereby in directions at right angles to the axis of the valve, as diagrammatically indicated by the arrows in Fig. 2. Because of the fact that the surface 22 is located beyond the surface 20 in an axial direction or in a direction from which the gases or their equivalent approach the open valve, and due to the fact that the peripheral edge of said surface 22 is relatively sharp, these gases or other media are sharply deflected and accordingly are maintained out of contact with the surface 20 so that the latter at no time is engaged by or comes into contact with these hot gases or their equivalent. The surface 20 thus maintains its surface characteristics indefinitely; and the valve consequently retains its efficiency and remains fluid tight for a maximum period. Regrinding of the valve surface 20 is thus done away with entirely or required only at extremely long intervals. Because of this fact, it is possible to cast the valve body 7 and its associated parts in cast iron without affecting the efficiency of the valve as a closure, thereby reducing the cost of production to minimum. The stem 15 and its head 16 may be constructed of steel or other suitable material.

The novel construction and arrangement illustrated and described provides a valve which is particularly adapted to withstand the intensively destructive effects exceptional to the operation of internal combustion engines and particularly of large internal combustion turbines.

Various changes in the specific form shown and described may be made within the scope of the claims without departing from the spirit of my invention.

I claim:

1. A valve for internal combustion turbines comprising a stem, a valve body carried thereby, an annular projection on said body having an annular sealing surface extending in a plane transverse to the axis of said valve, and a deflecting member projecting through the circular space defined by said annular projection and beyond said sealing surface, said deflecting member having a plane end surface against which the medium controlled by said valve impinges and whereby said medium as it passes by the seat controlled by said valve is deflected out of contact with said sealing surface when said valve is in its open position.

2. In an internal combustion turbine, the combination of a nozzle and a combustion chamber for explosive gases communicating with said nozzle, a valve seat including an annular plane sealing surface at the exit end of said nozzle, a nozzle valve including a body, an annular projection on said body having an annular plane sealing surface adapted to cooperate with said first named sealing surface to close said exit end, and a deflecting member projecting through the circular space defined by the annular projection and having a plane deflecting surface located beyond and in parallelism with the sealing surface of said annular projection whereby explosive gases as they pass through said exit end of the nozzle are deflected out of contact with the sealing surface of said valve in the open position of the valve.

In testimony whereof I have hereunto set my hand.

FRIEDRICH HOFMANN.